(12) United States Patent
Wu et al.

(10) Patent No.: US 8,259,782 B2
(45) Date of Patent: Sep. 4, 2012

(54) METHOD AND DEVICE FOR ESTIMATING A GAUSSIAN WHITE NOISE POWER IN A CHANNEL, AND RECEIVER

(75) Inventors: Gengshi Wu, Shenzhen (CN); Jing Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 813 days.

(21) Appl. No.: 12/423,085

(22) Filed: Apr. 14, 2009

(65) Prior Publication Data

US 2009/0201980 A1 Aug. 13, 2009

Related U.S. Application Data

(63) Continuation of application No. PCT/CN2008/070150, filed on Jan. 21, 2008.

(30) Foreign Application Priority Data

May 22, 2007 (CN) .......................... 2007 1 0099469

(51) Int. Cl.
*H04B 1/69* (2011.01)
*H04B 7/216* (2006.01)

(52) U.S. Cl. .......................... 375/148; 375/150; 370/342

(58) Field of Classification Search .................. 375/267, 375/285, 316, 346, 347, 130, 140, 142, 144, 375/147, 148, 150; 370/320, 335, 342, 441
See application file for complete search history.

(56) References Cited

U.S. PATENT DOCUMENTS

| 6,654,408 | B1 * | 11/2003 | Kadous et al. ................ 375/148 |
| 6,771,690 | B2 | 8/2004 | Heikkila |
| 2004/0008803 | A1 | 1/2004 | Aldrovandi et al. |
| 2006/0251024 | A1 | 11/2006 | Wang |

FOREIGN PATENT DOCUMENTS

| CN | 1502174 A | 6/2004 |
| CN | 1684379 A | 10/2005 |
| CN | 1742495 A | 3/2006 |
| CN | 101312364 B | 2/2012 |
| WO | WO 2004/032548 A1 | 4/2004 |

OTHER PUBLICATIONS

Written Opinion of the International Searching Authority in corresponding PCT Application No. PCT/CN2008/070150 (May 8, 2008).
"R1-02-0327—Equalization for frequency selective channels," 3GPP TSG RAN WAG1, 3$^{rd}$ Generation Partnership Project, Valbonne, France, Feb. 18-21, 2002.

\* cited by examiner

*Primary Examiner* — Tesfaldet Bocure
(74) *Attorney, Agent, or Firm* — Leydig, Voit & Mayer, Ltd.

(57) ABSTRACT

A method and device for estimating a Gaussian white noise power in a channel and a receiver are provided. The method includes performing a multi-path search on a received signal to find out paths of the signal; performing a noise estimation on one of the paths to acquire a total noise power of the path; performing an inter-path interference noise estimation on N paths spaced apart from the path by an integral number of chips to obtain an inter-path interference noise power of a single path of the signal, where N is an integer greater than or equal to 1; and subtracting the inter-path interference noise power from the total noise power to obtain the Gaussian white noise power. Through the technical solution of the disclosure, the Gaussian white noise power in a channel is obtained with a higher accuracy, so that the performance of equalization is enhanced.

9 Claims, 4 Drawing Sheets

METHOD AND DEVICE FOR ESTIMATING A GAUSSIAN WHITE NOISE POWER IN A CHANNEL, AND RECEIVER

CROSS-REFERENCE TO RELATED APPLICATIONS

This application is a continuation of International Patent Application No. PCT/CN2008/070150, filed Jan. 21, 2008, which claims the priority to Chinese Patent Application No. 200710099469.5, filed May 22, 2007, both of which are hereby incorporated by reference in their entirety.

FIELD OF THE INVENTION

The present disclosure relates to a communication technology, and more particularly to a method and device for estimating a Gaussian white noise power in a channel and a receiver.

BACKGROUND

In the wireless communication technology, in view of the inter-code interference and the multi-user interference caused by multi-path, an advance receiver, as the downlink receiver for Wideband Code Division Multiple Access (WCDMA), utilizes the Linear Minimum Mean Square Error (LMMSE) equalization reception technology to obtain an equalization weight Wd by channel estimation and Gaussian white noise (shorthanded as white noise below) power estimation according to the principle of a minimum mean square error between an equalized signal and a transmitted signal. Then, an LMMSE equalizer eliminates the interference caused by multi-path according to the equalization weight Wd, so as to generate an optimum reception signal.

Presently, the method for estimating a Gaussian white noise power in a multi-path signal obtains the Gaussian white noise power by deriving a single-path noise through a pilot channel. In a single antenna mode, a pilot signal transmits a fixed symbol, assumed as A. In a transmit diversity mode, all the symbols transmitted by a first antenna are A, and the symbols transmitted by a second antenna are periodically repeated in a pattern of <A,-A,-A,A>, with every two pilot symbols as a group. The symbols are regrouped so that the former and latter symbols in each group are the same. In this way, the same method can be utilized for estimating the Gaussian white noise power in receiving signals transmitted by a transmit diversity and a single antenna. That is, the noise power on the signal of each path is the remaining symbols obtained by removing the signal from the subtraction result of the former and latter symbols.

During the implementation of the present disclosure, the inventors have found that the existing systems has at least the following problems: the interference exists between two paths because cross-correlation is not zero when the code is not aligned, and the noise power in the signal of each path obtained by the existing systems also contains the inter-path interference noise power instead of being a pure Gaussian white noise power. Therefore, the Gaussian white noise power needed in LMMSE equalization cannot be characterized accurately, causing performance loss of equalization.

SUMMARY

In view of the problems in the existing systems, embodiments of the disclosure is directed to provide a method and device for estimating a Gaussian white noise power in a channel and a receiver, so as to acquire a more accurate Gaussian white noise power.

In order to achieve the above objective, an embodiment of the disclosure provides a method for estimating a Gaussian white noise power in a channel, which includes the following steps: (1) a multi-path search is performed on a received signal to find out paths of the signal; (2) a noise estimation is performed on one path of the paths to acquire a total noise power of the one path; (3) an inter-path interference noise estimation is performed on N paths spaced apart from the one path by an integral number of chips to obtain an inter-path interference noise power of a single path of the signal, where N is an integer greater than or equal to 1; and (4) the inter-path interference noise power is subtracted from a total noise power to obtain the Gaussian white noise power.

In order to achieve the above objective, an embodiment of the disclosure further provides a device for estimating a Gaussian white noise power in a channel, which includes a multi-path search module, a noise estimation module, an inter-path interference noise estimation module, and a subtracter. The multi-path search module is adapted to search paths of a signal. The noise estimation module is adapted to perform a noise estimation on one path of the paths searched by the multi-path search module to acquire a total noise power. The inter-path interference noise estimation module is adapted to perform an inter-path interference noise estimation on N paths spaced apart from the one path by an integral number of chips to acquire an inter-path interference noise power, where N is an integer greater than or equal to 1. The subtracter is adapted to subtract the inter-path interference noise power acquired by the inter-path interference noise estimation module from the total noise estimate acquired by the noise estimation module, so as to acquire the Gaussian white noise power.

In order to achieve the above objective, an embodiment of the disclosure further provides a WCDMA downlink receiver, which includes a signal reception module, a channel estimation module, a Gaussian white noise power estimation module, an equalization weight calculation module, and an equalizer. The signal reception module is adapted to receive a signal. The channel estimation module is adapted to perform a channel estimation on the signal received by the signal reception module. The Gaussian white noise power estimation module is adapted to perform a Gaussian white noise power estimation on the signal received by the signal reception module, so as to eliminate an inter-path interference noise power. The equalization weight calculation module is adapted to obtain an equalization weight according to a channel estimate obtained by the channel estimation module and the Gaussian white noise power obtained by the Gaussian white noise power estimation module. The equalizer is adapted to generate a useful signal according to the signal received by the signal reception module and the equalization weight obtained by the equalization weight calculation module.

By the above technical solution, the Gaussian white noise power in a channel is obtained more accurately, so that the Gaussian white noise power needed in LMMSE equalization is characterized more accurately and the performance loss of equalization is reduced.

The technical solution of the disclosure is to be described in further details with reference to accompanying drawings and embodiments hereinafter.

DETAILED DESCRIPTION

Figure 1:
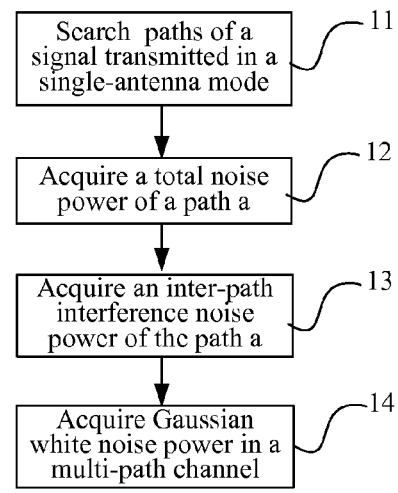
FIG. 1 is a flow chart of a first embodiment of a method for estimating a Gaussian white noise power in a channel.

FIG. 1 is a flow chart of a first embodiment of a method for estimating a Gaussian white noise power in a channel. This embodiment takes a received signal transmitted in a single-antenna mode as an example, and includes the following blocks:

In Block 11, a multi-path search is performed on a signal received by an advance receiver to find out paths of the signal, $Pn_l \cdot H_l + \delta_{nl}$, l=1, 2, ... m;

In Block 12, a noise estimation is performed on one path of the paths, such as path a: $Pn_a \cdot H_a + \delta_{na}$, to acquire a total noise power in the path;

Firstly, the $Pn_a \cdot H_a + \delta_{na}$ is descrambled and dispread. Then totally eight symbols at a time of t, time of t+1, ... time of t+7 are divided into groups, each consisting of two adjacent symbols. A subtraction is made within each group to acquire 4 group noise powers for the one path. Finally, a total noise power for the one path is obtained by averaging.

As for a first group of symbols for the one path, including a descrambled and dispread symbol received at the time of t and a descrambled and dispread symbol received at the time of t+1, the group noise power may be obtained by the following process.

The descrambled and dispread symbol received at the time of t is:

$$r_{t,a} = \sum_{j=1}^{256} Pn_{aj} \cdot H_{aj} \cdot Pn_{aj} + \sum_{j=1}^{256} \delta n_{t,aj} \cdot Pn_{aj}.$$

The descrambled and dispread symbol received at the time of t+1 is:

$$r_{t+1,a} = \sum_{j=1}^{256} Pn_{aj} \cdot H_{aj} \cdot Pn_{aj} + \sum_{j=1}^{256} \delta n_{t+1,aj} \cdot Pn_{aj}.$$

A group noise estimate is obtained through an intra-group cancellation by eliminating the header and trailer within a timeslot:

$$r_{t,a} - r_{t+1,a} = \sum_{j=1}^{256} \delta n_{t,aj} \cdot Pn_{aj} - \sum_{j=1}^{256} \delta n_{t+1,aj} \cdot Pn_{aj}.$$

A noise power with Gaussian white noise property is obtained as:

$$\delta_{group1,a}^2 = |r_{t,a} - r_{t+1,a}|^2 = \left| \sum_{j=1}^{256} \delta n_{t,aj} \cdot Pn_{aj} - \sum_{j=1}^{256} \delta n_{t+1,aj} \cdot Pn_{aj} \right|^2$$

And as for the Gaussian white noise power, $$E\left\{ \left( \sum_{j=1}^{256} \delta n_{t,aj} \cdot Pn_{aj} \right)^2 \right\} = E\left\{ \left( \sum_{j=1}^{256} \delta n_{t+1,aj} \cdot Pn_{aj} \right)^2 \right\}$$
$$= \delta_{CPICH,a}^2$$
$$= \sum_{j=1}^{256} \delta_{c,aj}^2 E\left\{ \sum_{j=1}^{256} \delta n_{t,aj} \cdot Pn_{aj} \cdot \sum_{j=1}^{256} \delta n_{t+1,aj} \cdot Pn_{aj} \right\}$$
$$= 0$$

Thus, $$\delta_{group1,a}^2 = 2 \cdot \delta_{CPICH,a}^2$$
$$= 2 \cdot \sum_{j=1}^{256} \delta_{c,aj}^2$$

Wherein, $\delta_{CPICH,a}^2$ is the symbol-level noise power on path a, and $\delta_{c,aj}^2$ is the chip-level noise power in the signal.

As for a second group for the one path, including symbols at the time of t+2 and t+3, a third group, including symbols at the time of t+4 and t+5, and a fourth group including symbols at the time of t+6 and t+7, the process for group noise power acquisition is similar to the above process. Besides, as the chip-level noise power for each path is the same, the chip-level noise power for each group on the one path is the same, and the noise power for the second, third, and fourth groups on the path is substantially the same as the noise power for the first group. The noise powers for the four groups are divided by the number of the symbols, 8, and the total noise power for the one path is obtained as, $$\delta_a^2 = \frac{\delta_{group1,a}^2 + \delta_{group2,a}^2 + \delta_{group3,a}^2 + \delta_{group4,a}^2}{4 \times 2}$$
$$\approx \frac{\delta_{group1,a}^2}{2}$$
$$= \delta_{CIPCH,a}^2.$$

In Block 13, a channel estimation is performed on one or more of the paths other than path a, namely the paths spaced apart from path a by an integral number of chips, that is, path 1, path 2, ..., path a−1, path a+1, ... and path m. In channel estimation on a plurality of the paths, the squared modulus of the obtained estimates are accumulated and multiplied by a preset constant factor, thereby obtaining the inter-path interference noise power of a signal of one path. In channel estimation on one of the paths, the inter-path interference noise power for a signal of the path can be obtained simply by multiplying the squared modulus of the obtained channel estimates by a preset constant factor. Then, the inter-path interference noise power is subtracted from the total noise power to obtain a more accurate Gaussian white noise. In order to reduce the influence of the inter-path interference noise power on the Gaussian white noise to the maximum extent, in this embodiment, the channel estimation is performed on all the paths spaced apart from path a by an integral number of chips, so as to obtain the inter-path interference noise power imposed on the path a by other paths more accurately, and thus the Gaussian white noise power of the path a, i.e., the Gaussian white noise power in the channel, is obtained more accurately.

Figure 2:
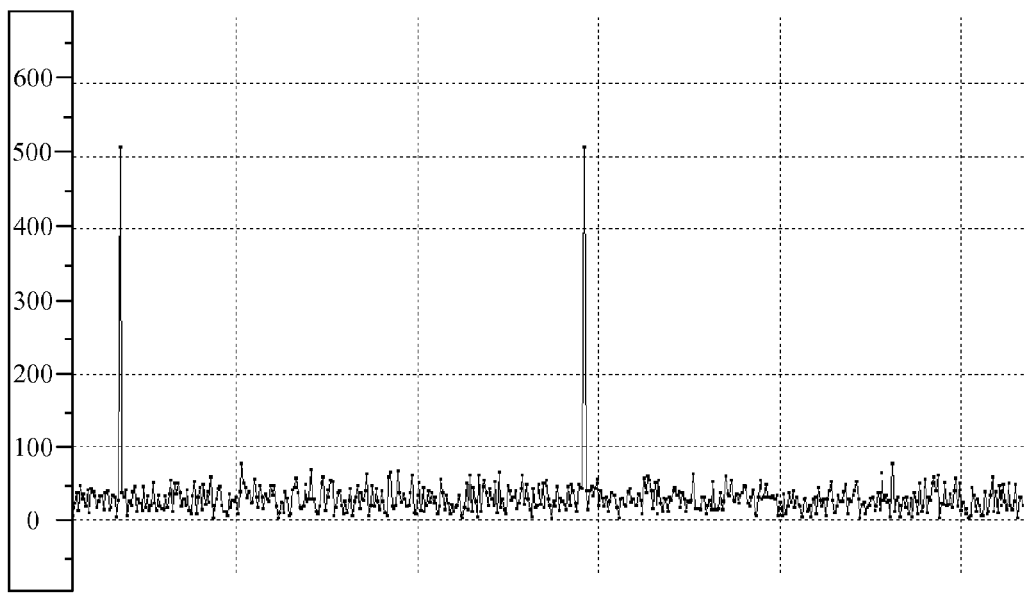
FIG. 2 is a schematic view of a Pseudo-Noise (PN) auto-correlation signal in the first embodiment of a method for estimating a Gaussian white noise power in a channel.

An inter-path interference noise, i.e., an interference noise imposed on the current path by other paths, occurs during descrambling and dispreading. When the path a is being descrambled and dispread, a Pseudo-Noise (PN) code is aligned with the path a for autocorrelation, and a maximum autocorrelation is exhibited. As for other paths, however, the PN is not aligned for autocorrelation, and characteristics of an autocorrelation side-lobe are exhibited. As shown in FIG. 2, the maximum or peak of autocorrelation is fixed, and the autocorrelation side-lobe may be considered as interferences on the current path from other paths, i.e., a Gaussian white noise with a mean of zero. However, as different traffic with different spread spectrum codes or spread spectrum factors in other paths all interfere with the path a, the inter-path interference noise may be treated as the Gaussian white noise.

It is assumed that a signal entering a descramble and dispread module has m paths:

$$InSignal = \sum_{l=1}^{a-1} Pn_{lj} + H_{lj} + Pn_{aj} \cdot H_{aj} + \sum_{l=a+1}^{m} Pn_{lj} \cdot H_{lj} + \delta_n$$

Wherein, $Pn_{aj} \cdot H_{aj}$ is the input signal to the path a, $$\sum_{l=1}^{a-1} Pn_{lj} \cdot H_{lj},$$

$$\sum_{l=a+1}^{m} Pn_{lj} \cdot H_{lj}$$

are signals spaced apart by an integral number of chips, i.e., other paths, and $\delta_n$ is the Gaussian white noise. As in descrambling and dispreading, only one sampling point is selected in each chip and the space between individual sampling points is an integral number of chips, only paths spaced apart by an integral number of chips interfere with the path a. The output signal that has been descrambled and dispread is:

$$OutSignal = \sum_{j=1}^{256} \left( \sum_{l=1}^{a-1} Pn_{lj} \cdot H_{lj} \right) \cdot Pn_{aj} + \sum_{j=1}^{256} Pn_{aj} \cdot H_{aj} \cdot Pn_{aj} +$$

$$\sum_{j=1}^{256} \left( \sum_{l=a+1}^{m} Pn_{lj} \cdot H_{lj} \right) \cdot Pn_{aj} + \sum_{j=1}^{256} \delta_n \cdot Pn_{aj}$$

-continued $$= \sum_{j=1}^{256} Pn_{aj} \cdot Pn_{aj} \cdot H_{aj} + \sum_{j=1}^{256} \left( \sum_{l=1}^{a-1} Pn_{lj} \cdot H_{lj} \cdot Pn_{aj} \right) +$$

$$\sum_{j=1}^{256} \left( \sum_{l=a+1}^{m} Pn_{lj} \cdot H_{lj} \cdot Pn_{aj} \right) + \sum_{j=1}^{256} \delta_n \cdot Pn_{aj}$$

Wherein, $$\sum_{j=1}^{256} Pn_{aj} \cdot Pn_{aj}$$

in the first term, which is the peak in the figure, is the signal to be received. After the former and latter symbols are cancelled out, the last three terms remain, of which the second and third terms are inter-path interference signals, $$\sum_{j=1}^{256} \left( \sum_{l=1}^{a-1} Pn_{lj} \cdot H_{lj} \cdot Pn_{aj} \right) + \sum_{j=1}^{256} (Pn_{lj} \cdot H_{lj} \cdot Pn_{aj}) =$$

$$\sum_{l=1}^{a-1} \left( \sum_{j=1}^{256} Pn_{lj} \cdot Pn_{aj} \right) \cdot H_{lj} + \sum_{l=a+1}^{m} \left( \sum_{j=1}^{256} Pn_{lj} \cdot Pn_{aj} \right) \cdot H_{lj}$$

let $$G_l = \left( \sum_{j=1}^{256} Pn_{lj} \cdot Pn_{aj} \right),$$

$G_l$ may be considered as a random signal with the property of Gaussian white noise, and thus $E\{G_l\}=0$;
$E\{G_l^2\}=K$, K is a constant, i.e., the statistical average power of PN code autocorrelation side-lobe power;

$E\{G_l G_p\}=0$, $l \neq p$;

Thus the inter-path interference noise power is derived as:

$$E\left\{ \left( \sum_{l=1}^{a-1} G_l H_l + \sum_{l=a+1}^{m} G_l H_l \right)^2 \right\} = E\left\{ \sum_{l=1}^{a-1} G_l^2 H_l^2 + \sum_{l=a+1}^{m} G_l^2 H_l^2 \right\}$$

$$= E\left\{ \sum_{l=1}^{a-1} G_l^2 H_l^2 + \sum_{l=a+1}^{m} G_l^2 H_l^2 \right\}$$

$$= E\{G_l^2\} \cdot \left( \sum_{l=1}^{a-1} H_l^2 + \sum_{l=a+1}^{m} H_l^2 \right)$$

$$= K \cdot \left( \sum_{l=1}^{a-1} H_l^2 + \sum_{l=a+1}^{m} H_l^2 \right).$$

Therefore, in the case of single antenna transmission, the inter-path interference noise power of the path a is a product of the accumulated channel estimates of other paths and a constant factor K.

In Block 14, the inter-path interference noise power imposed on the path a by other paths is subtracted from the total noise power of path a, and the Gaussian white noise power on a multi-path channel is derived as:

$$\delta_n^2 = \delta_a^2 - K \cdot \left( \sum_{l=1}^{a-1} H_l^2 + \sum_{l=a+1}^{m} H_l^2 \right).$$

Figure 3:
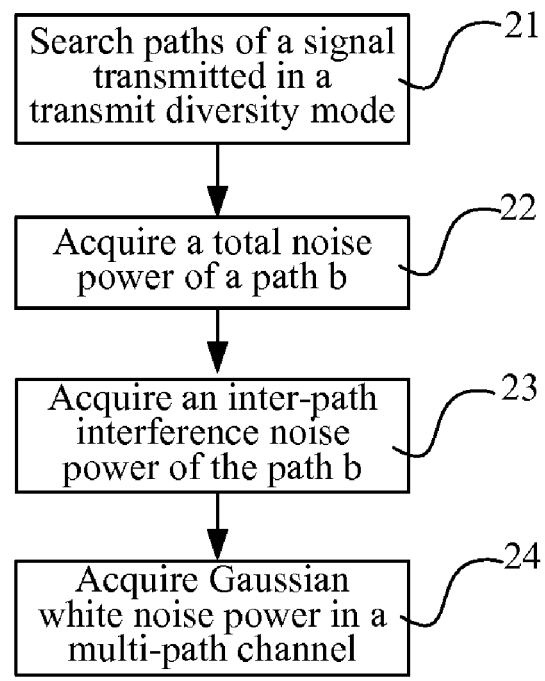
FIG. 3 is a flow chart of a second embodiment of a method for estimating a Gaussian white noise power in a channel.

FIG. 3 is a flow chart of a second embodiment of a method for estimating the Gaussian white noise power in a channel. This embodiment takes a received symbol transmitted in a transmit diversity mode as an example, and includes the following step:

In Block 21, a multi-path search is performed on a signal received by an advance receiver to find out each path of the signal, $Pn_l \cdot H_{l1} - Pn_l \cdot H_{l2} + \delta_{nl}$, l=1, 2, ... m;

In Block 22, a total noise estimation is performed on one path of the paths, such as a path b: $Pn_b \cdot H_{b1} - Pn_b \cdot H_{b2} + \delta_{nb}$. If the received symbol is transmitted in the transmit diversity mode, the symbols for the path b received at individual times are:

$$r_{t+i,b} = \sum_{j=1}^{256} Pn_{bj} \cdot H_{bj,1} \cdot Pn_{bj} - \sum_{j=1}^{256} H_{bj,2} \cdot Pn_{bj} + \sum_{j=1}^{256} \delta n_{t+i,bj} \cdot Pn_{bj}$$

Where, the first term in the equation represents a symbol transmitted by an antenna and the second term represents a symbol transmitted by another antenna. During subsequent acquisition of the total noise, as the first two terms for symbols at individual times are identical, only a value of the last term obtained from subtraction remains after the intra-group cancellation of each group, and the obtained group noise power of a single path remains constant, just like in the single antenna transmission mode:

$$\delta_b^2 = \frac{\delta_{group1,b}^2 + \delta_{group2,b}^2 + \delta_{group3,b}^2 + \delta_{group4,b}^2}{4 \times 2}$$

$$\approx \frac{\delta_{group1,b}^2}{2}$$

$$= \delta_{CPICH,b}^2$$

In Block 23, in the transmit diversity mode, as the transmit power of each transmit antenna is half of that of a single antenna, the inter-path interference noise power of the path b is a product of the accumulated channel estimates of other paths and a constant factor 0.5K:

$$0.5 \cdot K \cdot \left( \sum_{l=1}^{b-1} H_l^2 + \sum_{l=b+1}^{m} H_l^2 \right).$$

In Block 24, the Gaussian white noise power of the path b is derived as:

$$\delta_n^2 = \delta_b^2 - 0.5 \cdot K \cdot \left( \sum_{l=1}^{b-1} H_l^2 + \sum_{l=b+1}^{m} H_l^2 \right).$$

Figure 4:
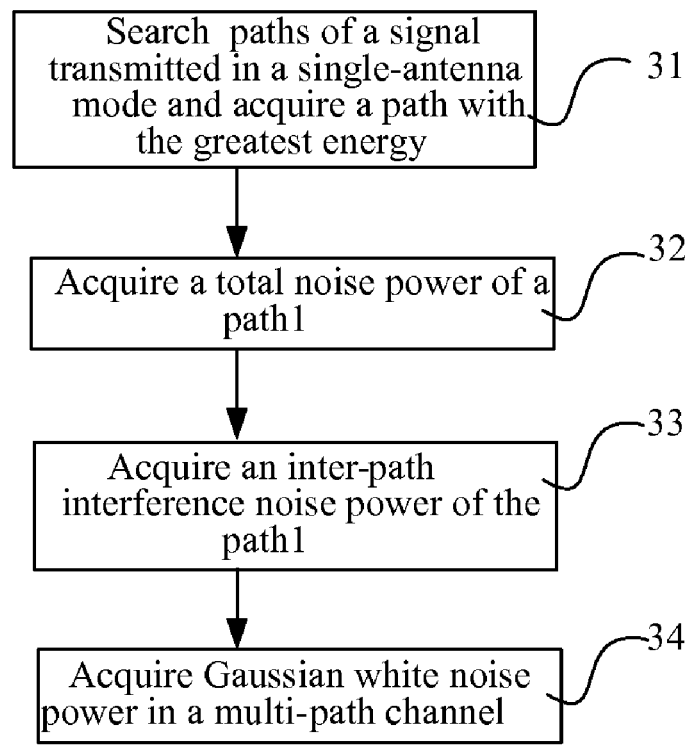
FIG. 4 is a flow chart of a third embodiment of a method for estimating a Gaussian white noise power in a channel.

FIG. 4 is a flow chart of a third embodiment of a method for estimating the Gaussian white noise power in a channel. As the path with the greatest energy has a relatively large energy itself and the energy of other paths is relatively small, the interference from other paths on the path with the greatest energy is relatively small. Moreover, the Gaussian white noise power in each path is fixed, so the smaller inter-path interference results in more accurate Gaussian white noise power estimation. This embodiment obtains the Gaussian white noise of a multi-path channel by estimating the Gaussian white noise of the path with the greatest energy in the signal, and includes the following steps:

In Block 31, assume that the received signal is transmitted in a single antenna mode, paths of the signal $Pn_l \cdot H_l + \delta_{nl}$ (l=1, 2, ... m) are found out through a multi-path search. Thereafter, an identifier is set for one path with the greatest energy in the paths, representing that the one path has the greatest energy, so that the one path can be differentiated from other paths. The one path with the greatest energy, such as a path 1: $Pn_l \cdot H_l + \delta_{nl}$, is selected according to the identifier.

In Block 32, a total noise power estimation is performed on the path 1 in the same way as the above embodiment to obtain the total noise power of the path 1 as:

$$\delta_1^2 = \frac{\delta_{group1,1}^2 + \delta_{group2,1}^2 + \delta_{group3,1}^2 + \delta_{group4,1}^2}{4 \times 2}$$

$$\approx \frac{\delta_{group1,1}^2}{2}$$

$$= \delta_{CPICH,1}^2$$

In Block 33, an autocorrelation side-lobe interference estimation is performed on other paths to obtain the inter-path interference noise power of the path 1 as:

$$K \cdot \sum_{l=2}^{m} H_l^2.$$

In Block 34, a more accurate Gaussian white noise power of a multi-path channel is obtained as:

$$\delta_1^2 - K \cdot \sum_{l=2}^{m} H_l^2.$$

In a transmit diversity mode, the Gaussian white noise power in a channel is acquired by a total energy noise estimation on the path with the greatest energy and an inter-path interference noise estimation imposed by other paths on the path with the greatest energy. The acquisition process is similar to the above discussion and thus is not repeated herein.

In the above embodiment, in acquisition of the inter-path interference noise power, other paths spaced apart from the path under total noise power estimation by an integral number of chips are further found out within an effective channel length. Since such paths would interfere with the path under total noise power estimation, a channel estimation is performed on the paths. The resulting estimates are accumulated and multiplied by a constant factor to obtain an inter-path interference noise power with a less error, so that the precision and accuracy of the Gaussian white noise power is further enhanced.

As the Gaussian white noise is random, an error may arise in power estimation at a certain time. At this time, the difference between the total noise power and the inter-path interference noise power may not be a positive number. In such a case, a non-negative protection may further be performed on the obtained Gaussian white noise power in a multi-path channel in acquisition of the Gaussian white noise power in the above embodiment. That is, a value is preset, with which the obtained Gaussian white noise is compared. If the Gaussian white noise power is smaller than the value, the obtained Gaussian white noise power is replaced by the value as the final Gaussian white noise power in the multi-path channel. Otherwise, the Gaussian white noise power remains unchanged.

Besides, as the noise is random, the power thereof can only be obtained with accuracy by long-term statistics, whereas the Gaussian white noise power changes over time due to environment variations or quantization operations. In view of this, the acquired Gaussian white noise power may further be filtered in the above embodiment. In this way, not only the burrs are eliminated, but also a more accurate value of Gaussian white noise power in a multi-path channel is obtained.

Figure 5:
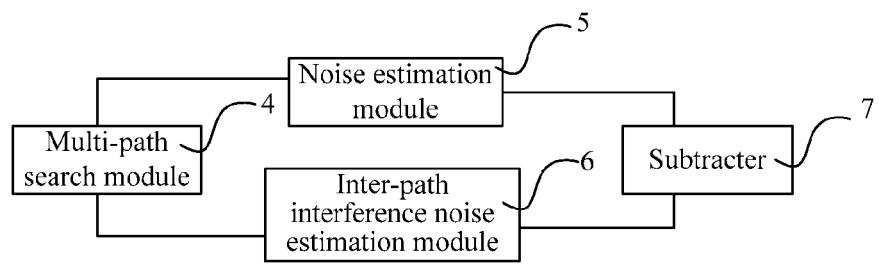
FIG. 5 is a structural view of a first embodiment of a device for estimating a Gaussian white noise power in a channel.

FIG. 5 is a structural view of an embodiment of a device for estimating a Gaussian white noise power in a channel. The device for estimating a Gaussian white noise power in a channel includes a multi-path search module 4, a noise estimation module 5, an inter-path interference noise estimation module 6, and a subtracter 7.

The multi-path search module 4 is adapted to search each path in a signal. The noise estimation module 5 is adapted to perform a noise estimation on one path of the paths searched by the multi-path search module 4 to acquire a total noise power of a single path. The inter-path interference noise estimation module 6 is adapted to perform an inter-path interference noise estimation on the paths searched by the multi-path search module 4, to acquire an inter-path interference noise power imposed by other paths on the one path under total noise power estimation. The subtracter 7 is adapted to subtract the inter-path interference noise power acquired by the inter-path interference noise estimation module 6 from the total noise estimate acquired by the noise estimation module 5, so as to acquire the Gaussian white noise power in a multi-path channel.

Figure 6:
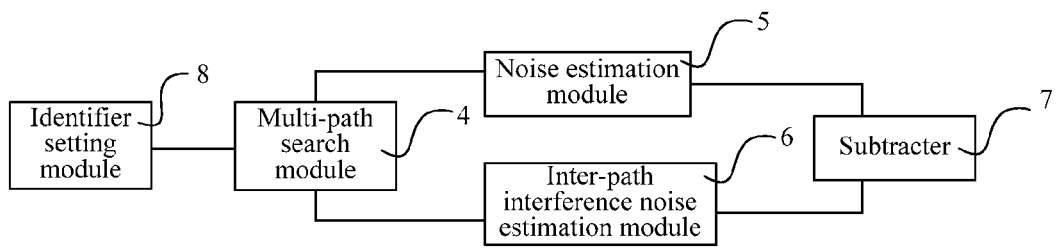
FIG. 6 is a structural view of a second embodiment of a device for estimating a Gaussian white noise power in a channel.

The device for estimating a Gaussian white noise power in a channel may further include an identifier setting module 8 as shown in FIG. 6, which is adapted to set an identifier on the signal of a path with the greatest energy searched by the multi-path search module 4.

Figure 7:
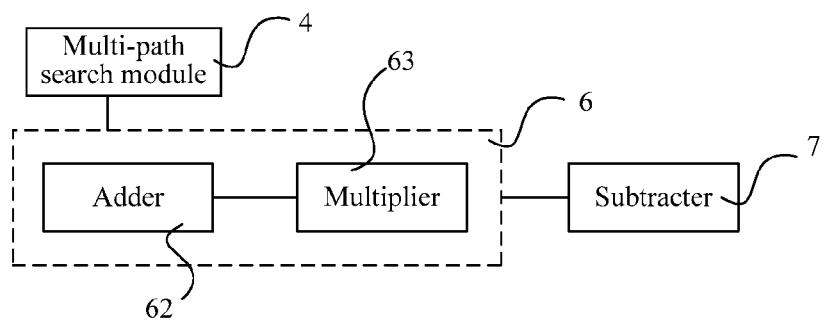
FIG. 7 is a structural view of a first embodiment of an inter-path interference noise estimation module in a device for estimating a Gaussian white noise power in a channel.
Figure 8:
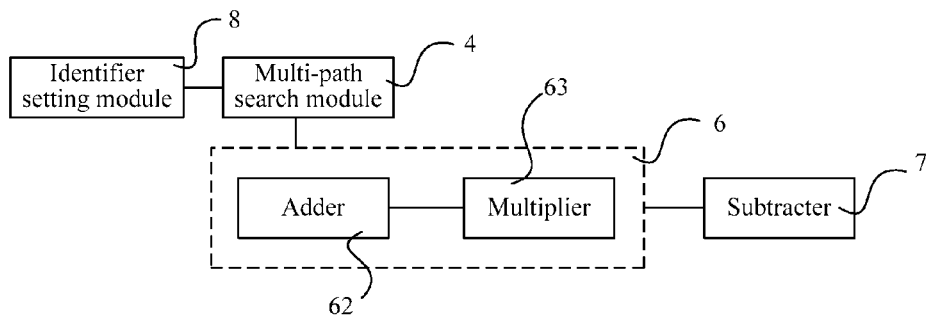
FIG. 8 is a structural view of a second embodiment of an inter-path interference noise estimation module in a device for estimating a Gaussian white noise power in a channel.

In practical implementation of the above device embodiment, the inter-path interference noise estimation module 6 may perform a channel estimation on at least one path that is spaced apart from the path under total noise power estimation by an integral number of chips in the paths searched by the multi-path search module 4. According to the obtained channel estimate and the preset constant factor, the inter-path interference noise power for a single path of the signal is obtained. Accordingly, the inter-path interference noise estimation module 6 may include an adder and a multiplier. As shown in FIGS. 7 and 8, the adder 62 is adapted to accumulate the squared modulus of the estimates obtained through channel estimation on the paths searched by the multi-path search module in the WCDMA receiver system. The multiplier 63 is adapted to multiply the accumulated value from the adder 62 by a constant factor, so as to obtain the inter-path interference noise power.

Figure 9:
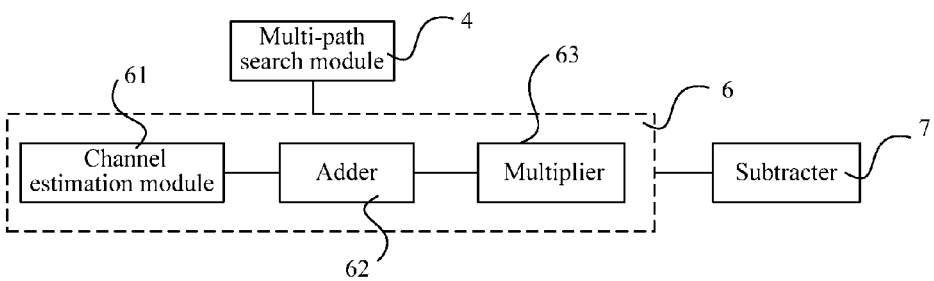
FIG. 9 is a structural view of a third embodiment of an inter-path interference noise estimation module in a device for estimating a Gaussian white noise power in a channel.
Figure 10:
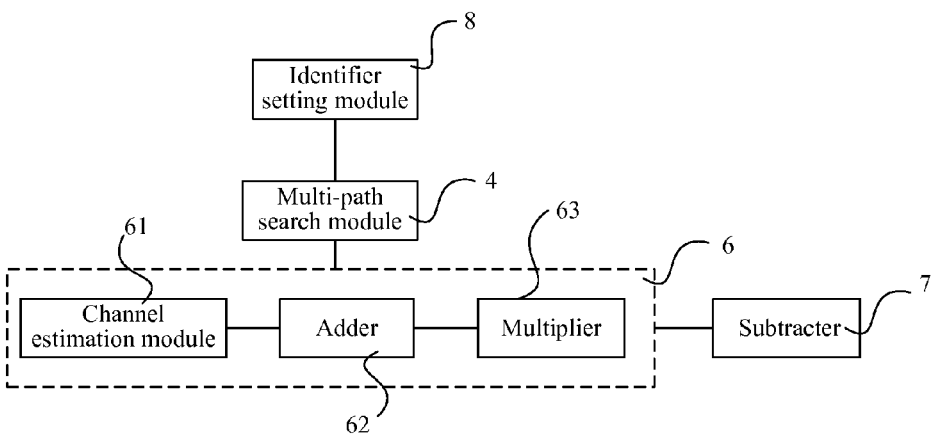
FIG. 10 is a structural view of a fourth embodiment of an inter-path interference noise estimation module in a device for estimating a Gaussian white noise power in a channel.

Alternatively, in the above device embodiment, the inter-path interference noise estimation module 6 may include a channel estimation module 61, an adder 62, and a multiplier 63. As shown in FIGS. 9 and 10, the channel estimation module 61 is adapted to perform a channel estimation on a signal of each path acquired by the multi-path search module 4. The adder 62 is adapted to accumulate the values obtained through the channel estimation by the channel estimation module 61. The multiplier 63 is adapted to multiply the accumulated value from the adder 62 by a constant factor. When it intends to obtain the Gaussian white noise power of the path a, and to estimate the inter-path interference noise power imposed on the path a by a path spaced apart from path a by an integral number of chips, the adder 62 may be omitted and is not repeated herein.

In the above device, there may be various different implementations such as the following: if only the inter-path interference noise power imposed on the path a by one path spaced apart from the path a by an integral number of chips is to be estimated, the adder 62 is omitted; if the inter-path interference noise power imposed on the path a by a plurality of paths spaced apart from the path a by an integral number of chips is to be estimated, the adder 62 needs to be added. Accordingly, the inter-path interference noise estimation module in the above device may equally include a channel estimation module and an inter-path interference noise power determination module. The interference noise power determination module is adapted to obtain the inter-path interference noise power of a single path of the signal according to the channel estimate obtained by the channel estimation module and a preset constant factor.

In the above device embodiment, the device for estimating a Gaussian white noise power in a channel may further include a non-negative protection module, which is adapted to perform a non-negative protection on the Gaussian white noise power obtained by the subtracter. Specific operations may be identical to those described in the method embodiment.

In the above device embodiment, the device for estimating a Gaussian white noise power in a channel may also include a filter, such as an alpha filter, which is adapted to filter the Gaussian white noise power obtained by the subtracter.

The devices in the above embodiments may respectively be integrated into an integrated circuit chip, so that the estimation of the Gaussian white noise power in a multi-path channel can be achieved by a single integrated circuit chip.

The structure in the integrated circuit chip for estimating Gaussian white noise power is the same as the structure in the embodiment of FIG. 5, and includes a multi-path search module, a noise estimation module, an inter-path interference noise estimation module, and a subtracter. The noise estimation module performs a total noise power estimation on a path searched by the multi-path search module, such as a path c. The inter-path interference noise estimation module performs a channel estimation on other paths, or accumulates the channel estimates of other paths spaced apart from the path c by an integral number of chips within an effective channel length and multiplies the accumulated value by a constant factor K, so as to obtain the inter-path interference noise power of the path c. The subtracter subtracts the value obtained by the inter-path interference noise estimation module from the value obtained by the noise estimation module, so as to acquire the Gaussian white noise power.

The integrated circuit chip for estimating the Gaussian white noise power may further include a non-negative protection module for a further non-negative protection on the acquired Gaussian white noise.

The integrated circuit chip for estimating the Gaussian white noise power may further include a filter for filtering the acquired Gaussian white noise power, so that the preciseness and accuracy of the estimation are further enhanced.

A WCDMA downlink receiver includes a signal reception module, a channel estimation module, a Gaussian white noise power estimation module, an equalization weight calculation module, and an equalizer. The signal reception module is adapted to receive a signal. The channel estimation module is adapted to perform a channel estimation on the signal received by the signal reception module. The Gaussian white noise power estimation module is adapted to perform a Gaussian white noise power estimation on the signal received by the signal reception module, so as to eliminate an inter-path interference noise power, thereby enhancing the accuracy of the Gaussian white noise power. The equalization weight calculation module is adapted to obtain an equalization weight according to the channel estimate obtained by the channel estimation module and the Gaussian white noise power obtained by the Gaussian white noise power estimation module. The equalizer is adapted to generate a useful signal according to the signal received by the reception module signal and the equalization weight obtained by the equalization weight calculation module. As the accuracy of the Gaussian white noise power is enhanced, the accuracy of the useful signal generated from the equalizer is enhanced accordingly.

The Gaussian white noise power estimation module is implemented by the device in the above device embodiment, and in this case, the channel estimation on other paths is accomplished by the channel statistics module in a downlink receiver or the channel estimation module arranged in a device for estimating a Gaussian white noise power in a channel.

By way of the method, device, and WCDMA downlink receiver for estimating a Gaussian white noise power in a channel according to the disclosure, the influence of the inter-path interference on the Gaussian white noise power is eliminated, a more accurate Gaussian white noise power is acquired, the Gaussian white noise power needed in LMMSE equalization is characterized more accurately, and the performance loss of equalization is avoided.

If the method for estimating a Gaussian white noise power in a channel according to the disclosure is produced as independent software, the software may be stored in any type of computer readable storage media. For example, the software may be stored in a recording medium, such as a disk medium magnetically, optically, or magneto-optically storing information that can be inserted into a driver of a computer system; in a fixed recording medium in a computer system, such as a hard disk drive; or in a solid-state computer memory. When a Gaussian white noise power in a channel is to be acquired, the software may be installed in the computer system. After starting the software, a multi-path channel signal is input to the computer system, and the computer system runs the software to output the Gaussian white noise power in a channel.

The above embodiments are merely intended to describe the technical solutions of the present invention, but not to limit the scope of present invention. It will be apparent to those skilled in the art that various modifications and variations can be made to the structure of the present invention without departing from the scope or spirit of the invention.

What is claimed is:

1. A method for estimating a Gaussian white noise power in a channel, comprising:
    performing a multi-path search on a received signal for determining paths of the received signal;
    performing a noise estimation on one of the paths for determining a total noise power of the one of the paths;
    performing an inter-path interference noise estimation on one or more paths spaced apart from the one of the paths by one or more chips for determining an inter-path interference noise power of a single path of the signal; and
    obtaining the Gaussian white noise power by subtracting the inter-path interference noise power from the total noise power;
    wherein, the process of performing the inter-path interference noise estimation on the one or more paths spaced apart from the one path by the one or more chips to obtain an inter-path interference noise power of a single path of the signal comprises:
    performing a channel estimation on the one or more paths;
    obtaining the inter-path interference noise power of the single path of the signal according to the obtained channel estimate and a preset constant factor which is obtained by making a statistic on a Pseudo-Noise (PN) code autocorrelation side-lobe power;
    if a number of the one or more paths is one (1), the process of obtaining the inter-path interference noise power of the single path of the signal according to the obtained channel estimate and the preset constant factor comprises: multiplying a squared modulus of the obtained channel estimate by the preset constant factor for obtaining the inter-path interference noise power of the single path of the signal; and
    if the number of the one or more path is greater than one (1), the process of obtaining the inter-path interference noise power of the single path of the signal according to the obtained channel estimate and the preset constant factor comprises: accumulating the squared modulus of the obtained channel estimate and multiplying an accumulated value by the preset constant factor to obtain the inter-path interference noise power of the single path of the signal.

2. The method according to claim 1, wherein performing a noise estimation on one path of the paths comprises: determining one path with the greatest energy in the paths and performing the noise estimation on the one path with the greatest energy.

3. The method according to claim 2, wherein determining one path with the greatest energy in the paths comprises: determining an identifier set during the multi-path search and obtaining the one path with the greatest energy according to the identifier.

4. The method according to claim 1, further comprising: comparing the Gaussian white noise power with a preset value, and setting the value equal to the Gaussian white noise power if the Gaussian white noise power is smaller than the value.

5. The method according to claim 1, further comprising: filtering the Gaussian white noise power.

6. A device configured to estimate a Gaussian white noise power in a channel, comprising:
    a multi-path search module, configured to search paths of a signal;
    a noise estimation module, configured to preform a noise estimation on one of the paths searched by the multi-path search module for acquiring a total noise power;
    an inter-path interference noise estimation module, configured to perform an inter-path interference noise estimation on one or more paths spaced apart from the one of the paths by one or more chips to obtain an inter-path interference noise power; and
    a subtracter, configured to subtract the inter-path interference noise power acquired by the inter-path interference noise estimation module from the total noise power acquired by the noise estimation module for obtaining the Gaussian white noise power;

wherein the inter-path interference noise estimation module comprises:
a channel estimation module, configured to perform a channel estimation on the one or more paths spaced apart from the one of the paths by one or more of the chips in the paths searched by the multi-path search module; and
an inter-path interference noise power determination module, configured to obtain the inter-path interference noise power of a single path of the signal according to the channel estimate obtained by the channel estimation module and a preset constant factor which is obtained by making a statistic on a Pseudo-Noise (PN) code auto-correlation side-lobe power; wherein
if a number of the one or more paths is one (1), the inter-path interference noise power determination module comprises: a multiplier, configured to obtain the inter-path interference noise power by multiplying squared modulus of the channel estimate obtained by the channel estimation module by the preset constant factor; and
if a number of the one or more paths is greater than one (1), the inter-path interference noise power determination module comprises:
an adder, configured to accumulate squared modulus of the channel estimate obtained by the channel estimation module; and
a multiplier, configured to obtain the inter-path interference noise power by multiplying an accumulated value obtained by the adder by the preset constant factor.

7. The device according to claim 6, further comprising: a non-negative protection module, configured to compare the obtained Gaussian white noise with a preset value, and if the Gaussian white noise power is smaller than the preset value, replace the obtained Gaussian white noise power by the preset value as the final Gaussian white noise power in the multi-path channel.

8. The device according to claim 6, further comprising a filter configured to filter the Gaussian white noise power obtained by the subtracter.

9. A Wideband Code Division Multiple Access (WCDMA) downlink receiver, comprising:
a signal reception module, configured to receive a signal;
a channel estimation module, configured to perform a channel estimation on the signal received by the signal reception module;
a Gaussian white noise power estimation module, configured to perform a Gaussian white noise power estimation on the signal received by the signal reception module for eliminating an inter-path interference noise power;
an equalization weight calculation module, configured to obtain an equalization weight according to a channel estimate obtained by the channel estimation module and the Gaussian white noise power obtained by the Gaussian white noise power estimation module; and
an equalizer, configured to obtain an equalized signal according to the signal received by the signal reception module and the equalization weight obtained by the equalization weight calculation module;
wherein, the Gaussian white noise power estimation module comprises:
a multi-path search module, configured to search paths of a signal;
a noise estimation module, configured to perform a noise estimation on one of the paths searched by the multi-path search module for acquiring a total noise power;
an inter-path interference noise estimation module, configured to perform an inter-path interference noise estimation on one or more paths spaced apart from the one of the paths by one or more chips to obtain an inter-path interference noise power; and
a subtracter, configured to subtract the inter-path interference noise power acquired by the inter-path interference noise estimation module from the total noise power acquired by the noise estimation module for obtaining the Gaussian white noise power;
wherein the inter-path interference noise estimation module comprises:
a channel estimation module, configured to perform a channel estimation on the one or more paths spaced apart from the one of the paths by one or more of the chips in the paths searched by the multi-path search module; and
an inter-path interference noise power determination module, configured to obtain the inter-path interference noise power of a single path of the signal according to the channel estimate obtained by the channel estimation module and a preset constant factor which is obtained by making a statistic on a Pseudo-Noise (PN) code auto-correlation side-lobe power; wherein
if a number of the one or more paths is one (1), the inter-path interference noise power determination module comprises: a multiplier, configured to obtain the inter-path interference noise power by multiplying squared modulus of the channel estimate obtained by the channel estimation module by the preset constant factor; and
if a number of the one or more paths is greater than one (1), the inter-path interference noise power determination module comprises:
an adder, configured to accumulate squared modulus of the channel estimate obtained by the channel estimation module; and
a multiplier, configured to obtain the inter-path interference noise power by multiplying an accumulated value obtained by the adder by the preset constant factor.

* * * * *